A. A. COATES.
WHEEL FOR RAILWAY CARRIAGES.
APPLICATION FILED SEPT. 11, 1913.
1,098,481.
Patented June 2, 1914.
2 SHEETS—SHEET 1.
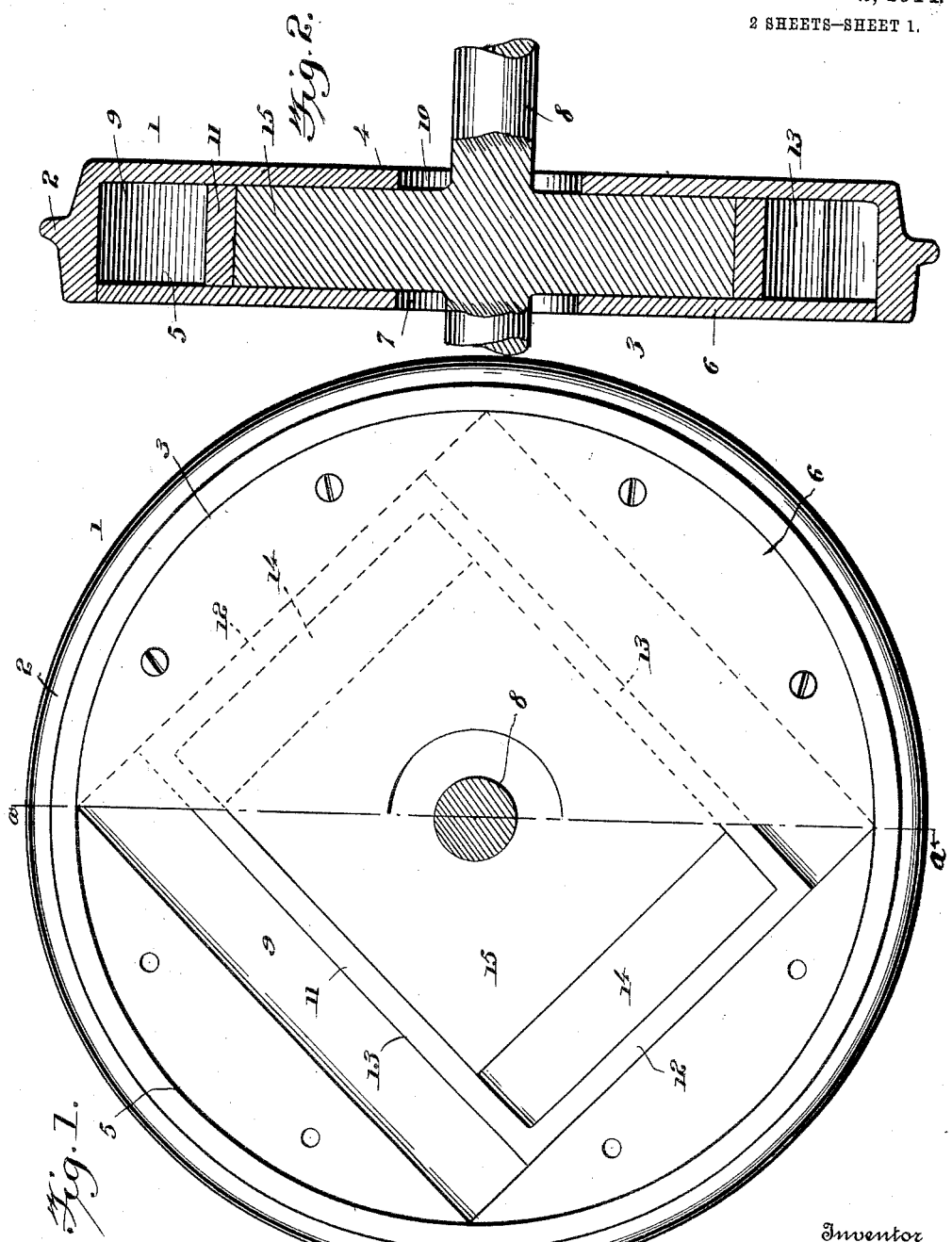

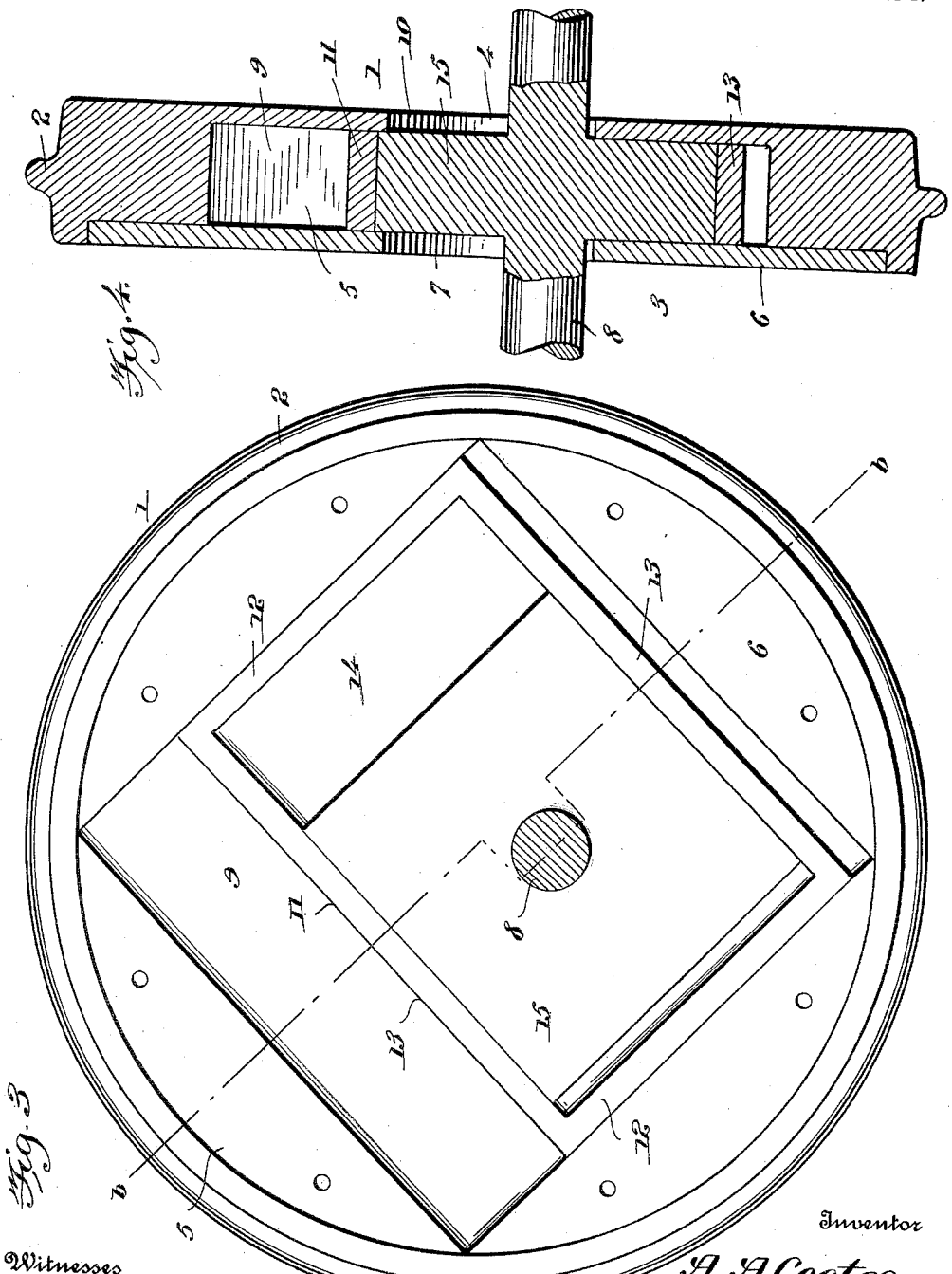

UNITED STATES PATENT OFFICE.

ALBERT A. COATES, OF NEW YORK, N. Y.

WHEEL FOR RAILWAY-CARRIAGES.

1,098,481.  Specification of Letters Patent.  Patented June 2, 1914.

Application filed September 11, 1913. Serial No. 789,339.

*To all whom it may concern:*

Be it known that I, ALBERT A. COATES, a subject of the King of Great Britain, residing at New York, in the county of New York and State of New York, have invented new and useful Improvements in Wheels for Railway-Carriages, of which the following is a specification.

This invention relates to improvements in wheels, especially wheels for the cars of railway trains, the object of the invention being to provide a wheel of improved construction which serves to elastically support an axle and to cushion all shocks incident to unevenness of the road bed and passing over rail joints, and thus enable a car equipped with my improved wheels to run smoothly and evenly without jarring and jolting, the invention consisting in the construction, combination and arrangement of devices hereinafter described and claimed.

In the accompanying drawings: Figure 1 is an elevation of a car wheel constructed in accordance with my invention and with a portion of the covering plate broken away so as to disclose the interior of the wheel, and showing the members of the wheel in one position. Fig. 2 is a vertical sectional view of the same on the plane indicated by the line *a—a* of Fig. 1. Fig. 3 is a view similar to Fig. 1 and showing the members of the wheel in another position. Fig. 4 is a sectional view on the plane indicated by the line *b—b* of Fig. 3.

My improved wheel may be used on vehicles of various kinds but for the purposes of this specification is shown as a car wheel. The wheel 1 is of substantially double the thickness of an ordinary car wheel and its flange 2 is substantially midway between the outer side 3 and the inner side 4. In the outer side of the wheel is a circular recess 5, concentric with the wheel and in this recess is secured a plate 6. At the center of the plate is a circular opening 7 through which the axle 8 may extend and the diameter of the said opening exceeds that of the axle, the latter, as will presently appear being eccentrically movable in the wheel. The body of the wheel is also provided with a chamber 9 which is covered by the plate 6 and is square. The rear side of the wheel has an opening 10 corresponding in shape and location with the opening 7, the axle extending through both of said openings.

Snugly fitted and movable in the chamber 9 of the wheel is an air cushion supporting member 11 which is of oblong rectangular form, its length corresponding to one dimension of the chamber 9 and its width being less than the other dimension of said chamber and hence the ends 12 of the said member 11 abut and slide against opposite side walls of the chamber 9 while the sides 13 of said member 11 are movable toward and from the other side walls of said chamber 9. This member 11 has an oblong rectangular chamber 14 therein. The spaces in the chamber 9 on opposite sides of the member 11 form air chambers.

A square supporting member 15 is arranged in the chamber 14 of the member 11, two of its sides slide against and are guided by the sides 13 of said member 11 and the said member 15 is movable with the member 11 in line with a radius of the wheel and is also movable in the chamber 14 and independently of the member 11 in line with another radius of the wheel at right angles to the first-named radius. The spaces in the ends of the chamber 14 form air chambers.

The member 11 is cushioned by the air confined in the chamber 9 of the wheel so that when it moves in either direction it compresses air and hence is air supported or cushioned. The member 15 is cushioned by the air confined in the chamber 14 of the member 11.

The axle 8 is fixed to the center of the supporting member 15 and in practice is preferably made integral with such member of each of the car wheels. By thus providing the wheels with air confining chambers, providing the members 11 which are movable in said chambers and are air cushioned and supported in and also by providing the axle with members 15 which are arranged and movable in air confining chambers in the member 11 and at right angles to the plane of movement of said members 11 the axle is supported by said air cushioned movable members and is permitted to move eccentrically in the wheel so that the wheel is adapted to move vertically under the shocks incident to unevenness of the road bed and passing over bad joints but such shocks are cushioned and not communicated to the axle and hence a car equipped with my improved wheels runs smoothly without jarring and jolting.

While I have herein shown and described a preferred form of my invention I would have it understood that changes may be made in the form, proportion and construction of the several parts without departing from the spirit of my invention and within the scope of the appended claims.

Having thus described my invention, I claim:

1. A wheel having an air chamber, a chambered air cushioned supporting member movable in said air chamber in line with a radius of the wheel and an axle supporting air cushioned member movable in the air chamber of the first-mentioned member in a line at right angles to that of the line of movement of and also movable with the first-mentioned supporting member.

2. A wheel having an air chamber and also provided in its front and rear sides with central openings, and air cushioned supporting members movable in said air chamber of the wheel in line with a radius of the wheel and also provided with an air chamber, an axle of less diameter than and extending through the said openings of the wheel and movable eccentrically in the wheel, the said axle having an air cushioned supporting member arranged in the chamber of the first-mentioned supporting member and movable with said first-named supporting member and also movable independently thereof and at right angles to the plane of movement thereof.

In testimony whereof I affix my signature in presence of two witnesses.

ALBERT A. COATES.

Witnesses:
A. C. BRINKAM,
WILLIAM GOULDING.

---

Copies of this patent may be obtained for five cents each, by addressing the "Commissioner of Patents, Washington, D. C."